United States Patent
Herskowitz et al.

(10) Patent No.: US 12,007,188 B2
(45) Date of Patent: Jun. 11, 2024

(54) FIREARM WITH AUTOMATIC TARGET ACQUIRING AND SHOOTING

(71) Applicant: ISRAEL WEAPON INDUSTRIES (I.W.I.) LTD., Ramat HaSharon (IL)

(72) Inventors: Gil Herskowitz, Ramat-Gan (IL); Aviram Sobol, Netanya (IL); Zeev Shneorson, Raanana (IL)

(73) Assignee: ISRAEL WEAPON INDUSTRIES (I.W.I) LTD, Ramat Hasharon (IL)

(*) Notice: Subject to any disclaimer, the term of this patent is extended or adjusted under 35 U.S.C. 154(b) by 359 days.

(21) Appl. No.: 16/837,028

(22) Filed: Apr. 1, 2020

(65) Prior Publication Data
US 2021/0140733 A1 May 13, 2021

(30) Foreign Application Priority Data
Nov. 11, 2019 (IL) .......................................... 270559

(51) Int. Cl.
*F41A 19/64* (2006.01)
*G06N 20/00* (2019.01)
*G01S 7/41* (2006.01)
*G01S 7/48* (2006.01)
*G06V 20/10* (2022.01)

(52) U.S. Cl.
CPC .............. *F41A 19/64* (2013.01); *G06N 20/00* (2019.01); *G01S 7/41* (2013.01); *G01S 7/4802* (2013.01); *G06V 20/10* (2022.01)

(58) Field of Classification Search
CPC .......... F41A 19/59; F41A 19/64; F41A 17/06; F41A 17/08
USPC ..................................... 89/28.05, 28.1, 28.2
See application file for complete search history.

(56) References Cited

U.S. PATENT DOCUMENTS

| | | | |
|---|---|---|---|
| 4,004,729 A | 1/1977 | Rawicz et al. | |
| 5,392,688 A | 2/1995 | Boutet et al. | |
| 5,557,685 A | 9/1996 | Schlossers et al. | |
| 7,650,826 B2 | 1/2010 | Son et al. | |
| 9,025,040 B2* | 5/2015 | Thyssen | F41G 3/165 |
| | | | 235/407 |
| 9,127,907 B2* | 9/2015 | Lupher | F41G 3/00 |
| 9,222,754 B2* | 12/2015 | Lupher | F41G 1/38 |
| 9,310,163 B2 | 4/2016 | Bay | |
| 10,097,764 B2* | 10/2018 | Ehrlich | F41G 3/165 |
| 10,168,123 B2 | 1/2019 | Lyren | |

(Continued)

FOREIGN PATENT DOCUMENTS

| | | |
|---|---|---|
| CN | 204902679 U | 12/2015 |
| EP | 0605290 A1 | 7/1994 |

(Continued)

*Primary Examiner* — Jonathan C Weber
(74) *Attorney, Agent, or Firm* — SOROKER AGMON NORDMAN RIBA (57) ABSTRACT

A firearm that automatically controls the release of bullets, including one or more sensors that provide real-time sensor data of the view in front of the firearm, a computer that identifies legitimate targets in the real-time sensor data, without user intervention, a trigger sensor that determines directly or indirectly if the trigger is engaged, wherein as long as the trigger is engaged, the firearm is configured to continuously acquire real-time sensor data, identify legitimate targets and automatically release bullets when the firearm is directed toward the identified targets.

21 Claims, 3 Drawing Sheets

(56) References Cited

U.S. PATENT DOCUMENTS

| | | | |
|---|---|---|---|
| 10,900,733 B2* | 1/2021 | Itzhakian | F41A 35/00 |
| 2006/0005447 A1 | 1/2006 | Lenner et al. | |
| 2008/0020570 A1 | 1/2008 | Naik | |
| 2014/0028856 A1 | 1/2014 | Ehrlich | |
| 2015/0101229 A1 | 4/2015 | Hall | |
| 2015/0108215 A1* | 4/2015 | Ehrlich | F41G 3/06 |
| | | | 235/404 |
| 2015/0308771 A1* | 10/2015 | Marr | F41G 3/12 |
| | | | 42/84 |
| 2015/0345887 A1 | 12/2015 | Shneorson et al. | |
| 2016/0377381 A1* | 12/2016 | Lyren | F41G 3/165 |
| | | | 345/633 |
| 2019/0137219 A1* | 5/2019 | Bockmon | F41G 5/16 |
| 2019/0346226 A1* | 11/2019 | Shneorson | F41A 19/66 |
| 2020/0182576 A1* | 6/2020 | Itzhakian | F41A 17/08 |

FOREIGN PATENT DOCUMENTS

| | | |
|---|---|---|
| EP | 1817538 B1 | 3/2013 |
| KR | 101533905 B1 | 7/2015 |
| KR | 101915197 B1 | 11/2018 |
| WO | 2012/121735 A1 | 9/2012 |
| WO | 2012/131548 A1 | 10/2012 |

\* cited by examiner

FIREARM WITH AUTOMATIC TARGET ACQUIRING AND SHOOTING

FIELD OF THE DISCLOSURE

The present disclosure relates generally to handheld firearms and more specifically to a firearm that automatically releases bullets responsive to identifying a target.

BACKGROUND OF THE DISCLOSURE

In many cases firearms are used in dangerous situations, for example where a user is under duress and is required to respond rapidly and accurately to threats. In such cases the user needs to take a specific set of actions to neutralize a threat, including identifying the threat, aiming the firearm, squeezing the trigger to release a bullet or round of bullets, assessing the results and repeating actions. Reducing the number of required actions can thus reduce the time it takes the user to neutralize a threat.

U.S. Pat. No. 9,557,130 issued to Shneorson dated Jan. 31, 2017 the disclosure of which is incorporated herein by reference, discloses an apparatus and method for improving hit probability of a firearm. Shneorson describes a firearm that prevents misfire wherein the user aims then presses and holds the trigger to release a first bullet. The aim of the firearm may deviate from the target due to the recoil of the firearm or other distractions. The firearm disclosed in Shneorson is designed to automatically and as long as the trigger is engaged, release additional bullets when the user manages to re-aim the firearm to approximately the same direction as when releasing the first bullet.

The above method disclosed in Shneorson eliminates the need of the user to accurately re-aim the barrel of the firearm and then press the trigger when reaching the desired position, rather it is sufficient to only point the barrel to the approximate direction previously acquired and the firearm releases bullets when the barrel is pointed correctly. That method has been found to increase the shooting rate, ability of the user to hit a target and improve lethality. The above method is excellent for a motionless shooter and motionless target. However if either is moving it will not improve the hit probability. Likewise if the user wishes to fire at a new target he must release the trigger and start over.

U.S. patent application Ser. No. 16/362,656 filed Mar. 24, 2019 the disclosure of which is incorporated herein by reference discloses a firearm controlled by user behavior, wherein when the trigger is engaged the firearm continues to release bullets based on the user's behavior, which provides an indication if the user is attempting to shoot and if the target is stationary or in motion.

In any case, the release of a bullet is based on decisions of the user, which may not always be accurate. The user needs to identify the target, aim the firearm, squeeze the trigger to release a bullet and keep the digger engaged for an electro-mechanical fire control (EMFC) system to fire additional bullets based on the user behavior. However if the user is not pointing the firearm to a target the system will fire based on user behavior.

U.S. patent application Ser. No. 16/252,643 filed Jan. 20, 2019 the disclosure of which is incorporated herein by reference discloses an electro-mechanical fire control (EMFC) system.

A method of automation of the decision to release additional bullets can increase the speed and accuracy for correctly releasing bullets. Thus ail improved system and method is desirable.

SUMMARY OF THE DISCLOSURE

An aspect of an embodiment of the disclosure, relates to a firearm that controls the release of bullets based on automatic identification of targets by the firearm. The firearm includes one or more image sensors that record image data in real-time. The data enables the firearm to construct images representing the view in front of the firearm. The firearm includes a computer that analyzes the images, identifies targets and automatically releases bullets at a moment when the firearm is aimed toward the target and the computer calculated that the bullets will hit the target or at least hit very close to the target.

In an exemplary embodiment of the disclosure, the firearm includes status sensors that samples the lighting or visibility of the image obtained by the one or more sensors. The computer selects, which sensors from the one or more sensors will be used to collect the real-time data based on the measurements of the status sensors, for example one sensor may be used to collect real-time data in good visibility and another in poor visibility e.g. for collecting images in smoke or fog. Optionally, multiple sensors can be used simultaneously to enhance accuracy of the results.

There is thus provided according to an exemplary embodiment of the disclosure, a firearm that automatically controls the release of bullets, comprising:
  One or more sensors that provide real-time image data of the view in front of the firearm;
  A computer that identifies legitimate targets in the real-time sensor data, without user intervention;
  A trigger sensor or hammer sensor that determines if the trigger is engaged;
  Wherein as long as the trigger is engaged, the firearm is configured to continuously acquire real-time sensor data, identify legitimate targets and automatically release bullets when the firearm is directed toward an identified target. Optionally the firearm computer predicts when to release bullets so the identified target will be hit. The prediction is based on a ballistic solution, target distance and speed, user (shooter) movements, time it takes from command until the projectile exits the firearms barrel and the time of flight until the bullet hits the target.

In an exemplary embodiment of the disclosure, the one or more sensors include a camera, an infrared sensor, an acoustic sensor, an RF sensor a radar, or a Lidar. Optionally, the firearm includes a status sensor that samples lighting, such as light intensity or visibility of the view in front of the firearm or based on obtained images and selects a sensor or sensors from the one 01 more sensors responsive to the measured status in the view in front of the firearm. In an exemplary embodiment of the disclosure, the firearm uses two or more different types of sensors to acquire real-time image data to enhance accuracy. Optionally, the identified legitimate targets include a target that is designated by a device external to the firearm. In an exemplary embodiment of the disclosure, the firearm releases a first bullet immediately when the trigger is engaged by the user, before identifying targets and continue to release bullets automatically at the identified targets until the trigger is released. Alternatively, the firearm first identifies targets before releasing a first bullet so the first bullet is released at an identified target and the firearm continues to release bullets automatically at the identified targets until the trigger is released.

In an exemplary embodiment of the disclosure, the firearm includes a mode selector (which can be any type of user input device, such as a lever, button, switch or other element) configured to activate and deactivate the automatic release of bullets. Optionally, the firearm includes a mode selector configured to activate a learning mode in which a user teaches the firearm what are legitimate targets or what are non-legitimate targets by pointing the firearm towards exemplary target and indicating to the firearm whether the target is legitimate or not. In an exemplary embodiment of the disclosure, the firearm includes a mode selector configured to activate a calibration mode in which a user calibrates the one or more sensors of the firearm. Optionally, the legitimate targets identified automatically when initially engaging the trigger are the only targets considered from within the later real-time image data, while the trigger is still engaged. Alternatively, legitimate targets are identified automatically in the real-time image data even if they did not appear in the real-time image data when the trigger was initially engaged.

In an exemplary embodiment of the disclosure, the firearm is preconfigured to release bullets toward less-lethal areas on the target. Alternatively, the firearm is preconfigured to release bullets toward lethal areas on the target. In an exemplary embodiment of the disclosure, the computer includes a firing window module that is configured to calculate when to release a bullet for each shot so the target will be hit based on a status of the firearm, environmental factors (such as wind speed, temperature, humidity and other factors), ballistic solution, bullet firing delay or the position and/or motion of the target relative to the barrel of the firearm. Optionally, the firing window module sets the firing window size for allowing release of bullets when the target is aligned within the firing window. In an exemplary embodiment of the disclosure, the firing window size is adapted to the stability of the user or the target motion, to increase probability of hitting the target. Optionally, the computer decides if to fire a bullet at lethal areas or less-lethal areas of the target based on the type of firearm and initial settings. In an exemplary embodiment of tire disclosure, the firing window module is programed to calculate the best point in time to release a bullet to hit the target according to a specific scenario of each shot.

There is further provided according to an exemplary embodiment of the disclosure, a method of controlling the release of bullets from a firearm, comprising:

Engaging a trigger of the firearm;

Determining if the trigger is engaged by a trigger sensor or a hammer sensor;

As long as the trigger is engaged continuously acquiring with one or more sensors real-time image data of the view in front of the firearm;

Using a computer to automatically identify legitimate targets in the real-time image data, without user intervention;

Automatically releasing bullets when the firearm is directed toward an identified target or when the computer predicts the identified target will be hit. This prediction is based on a ballistic solution, target distance and speed, user (shooter) movements, time it takes from command until the projectile exits the rifles barrel, and the time of flight until the bullet hit the target.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1A:
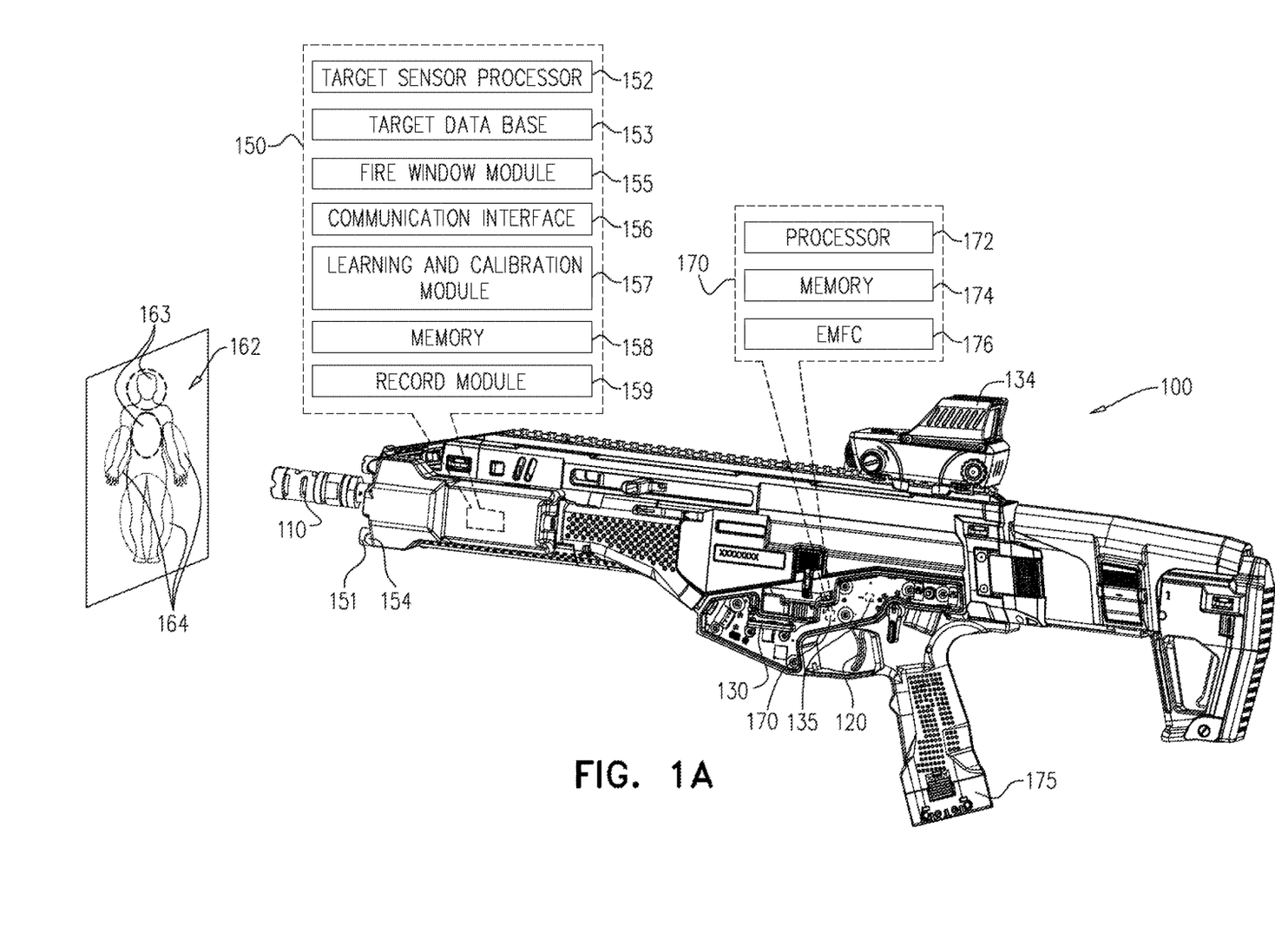
FIG. 1A is a schematic illustration of a target controlled firearm, according to an exemplary embodiment of the disclosure.
Figure 1B:
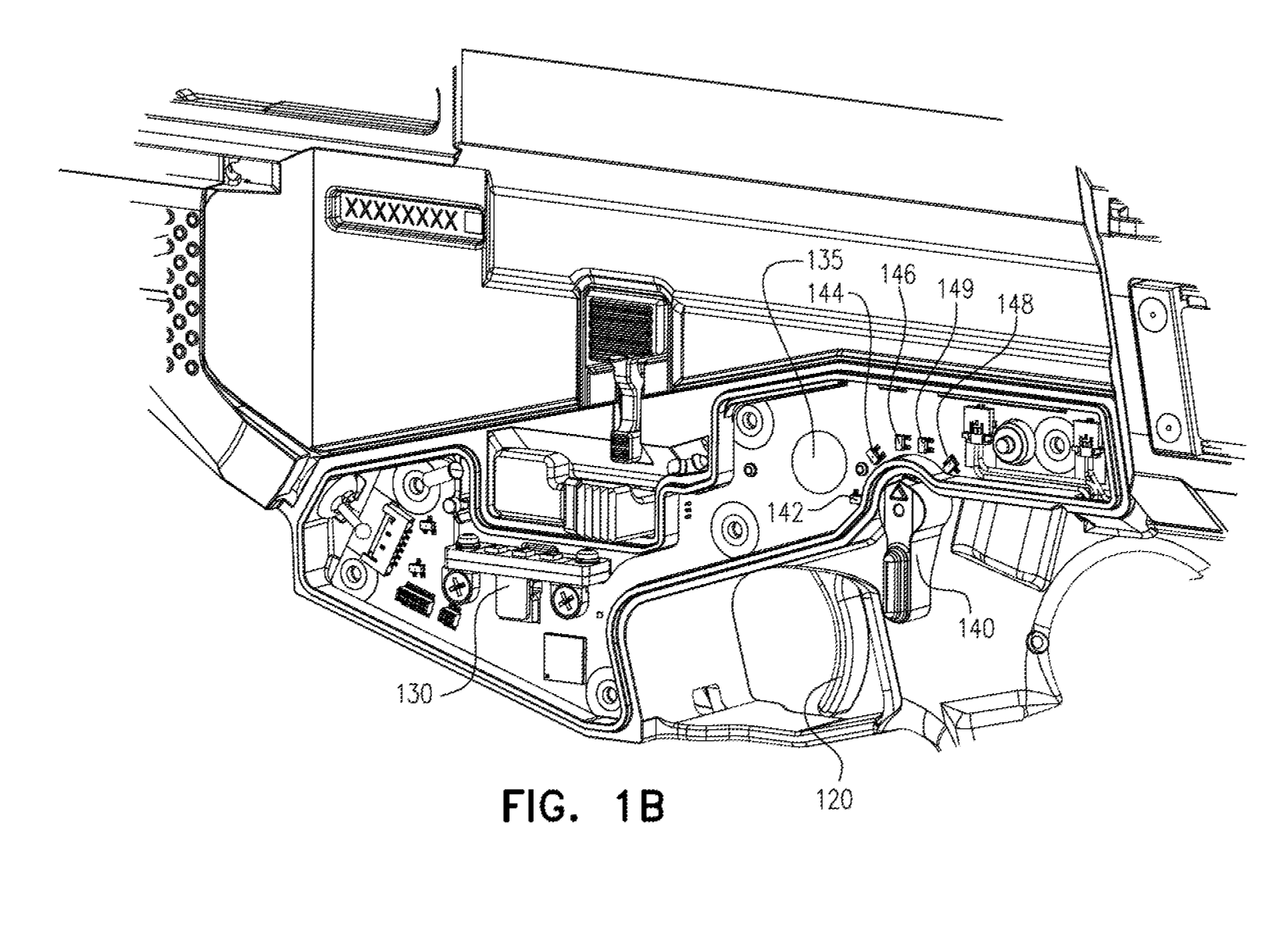
FIG. 1B is a schematic illustration of an enlarged view of a target controlled firearm, according to an exemplary embodiment of the disclosure.

FIG. 1A is a schematic illustration of a target controlled firearm 100 and FIG. 1B is an enlarged view of elements of the target controlled firearm 100, including according to an exemplary embodiment of the disclosure. Firearm 100 is a semi-automatic or fully automatic firearm. Firearm 100 may include rifles, hand guns, submachine guns, semi-automatic guns and rifles, automatic guns and rifles, and other firearms. The firearm 100 comprises a target sensor 151, a target computer 150, a fire control computer 170, a barrel 110, a mode selector 140 and a trigger 120 for releasing a bullet or sequence of bullets through the barrel toward a target 162.

In an exemplary embodiment of the disclosure, upon engaging the trigger 120 and releasing a first bullet the target computer 150 receives a signal from the fire control computer 170 that the firearm 100 was discharged, i.e. a bullet or another projectile was shot from the firearm 100. The target computer 150 analyzes data received from target sensor 151 to automatically identify a target 162 or targets that it assumes the user was aiming at. Firearm 100 continuously releases bullets whenever firearm 100 calculates that it is aimed to hit a target 162 or targets. In any case the target identification is performed automatically by the firearm 100 without user intervention once the user engages the trigger and keeps the trigger engaged, i.e. pressed. When the user releases the trigger the target computer 150 and fire control computer 170 are reset to handle a new case.

In an exemplary embodiment of the disclosure, the target sensor 151 can be any sensing device that enables forming an image of the view in front of the firearm for identifying targets, for example a night vision camera, a low light camera, a CCD camera, a CMOS camera, an Infra-red thermal sensor (IR), a short wave infra-red (SWIR) sensor, an acoustic sensor (e.g. for noisy targets), an RF sensor (e.g. for electromagnetic radiating targets), a Radar or LIDAR especially for poor vision conditions and other sensors. Optionally, target sensor 151 may include multiple types of imaging sensors and one or more status sensors 154 that determine the viewing condition and select a type of imaging sensor based on the viewing conditions. For example, a Radar may be used for poor visibility (e.g. fog or smoke), a CCD may be used for good visibility and good lighting conditions, and a night vision camera may be used in low or no light conditions. In some embodiments of the disclosure, target sensor 151 may use two or more different types of imaging sensors to sample the view (e.g. simultaneously or sequentially) and combine the results to enhance accuracy in identifying targets 162, for example a CCD and IR to identify objects and differentiate between living/warm objects and inanimate objects.

In an exemplary embodiment of the disclosure, the mode selector 140 enables a user to select various modes of operation of the firearm 100 (see FIG. 1B), for example.

1. A safe mode (142) that prevents (mechanically and/or electronically) releasing bullets from the firearm 100;
2. A semi-automatic mode (144) that enables release of a single bullet or projectile every time the trigger is engaged;
3. A burst mode (not shown) that releases a specific number of bullets or projectiles each time the trigger is engaged;
4. An automatic mode (not shown) that releases bullets or projectiles as long as the trigger is engaged;
5. A two-hit target identification mode (146) in which the firearm releases a first bullet immediately when the trigger is engaged and releases additional bullets automatically while the trigger is engaged responsive to identifying a target and determining that the firearm is positioned to hit the target;
6. A learning and calibration mode (148) in which a user teaches the firearm 100, what is a legitimate target and what is not by pointing the firearm towards an exemplary target and indicating to the firearm whether the target is legitimate or not, so that the firearm 100 will be able to automatically fire at legitimate targets and refrain from firing at non-legitimate targets. In some embodiments of the disclosure, this mode is also used to calibrate between the target sensor 151 and regular sights or aiming systems provided with the firearm 100.
7. A first-hit target identification mode (149) in which the firearm first identifies a target and determines that the firearm is positioned to hit the target before releasing a first bullet and additional bullets released while the trigger is engaged.
8. A Less Lethal target identification mode (not shown) in which the firearm identifies a target and determines that the firearm is positioned to hit an area around the target (e.g. near the target, just missing the target, or hitting a less lethal area on the target) before releasing a bullet and additional bullets while the trigger is engaged.

In some embodiments of the disclosure, the firearm 100 may include two learning modes, one positive and one negative. The positive mode teaches legitimate targets and the negative mode teaches non-legitimate targets.

In an exemplary embodiment of the disclosure, a legitimate target for a combat soldier may be a vehicle, a drone, a multi-copter, a balloon, an enemy soldier and the like, whereas a non-legitimate target may be soldier wearing the uniform of the user's army to prevent accidental fire on fellow combatants. In contrast, a hunter may define legitimate targets as animals or specific types of animals, whereas humans would be defined as non-legitimate targets to prevent firing at people. Although according to some embodiments of the disclosure, the user may always release a first shot at any target (at mode 146). However, while the user is continuously engaging the trigger 120 additional bullets will only be released toward legitimate targets.

In an exemplary embodiment of the disclosure, the firearm may be preprogrammed to identify legitimate and/or lion-legitimate targets. Alternatively, or additionally, the user can program the firearm 100, for example by placing the firearm in learning mode 148 and releasing a predefined number of bullets toward legitimate targets. Alternatively, the user may press the trigger without ammunition while aiming towards non-legitimate targets. Optionally, in learning mode 148 the firearm 100 may learn what a legitimate or non-legitimate target is by sampling the view with sensor 151 every time the user engages the trigger 120 without actually releasing any bullets. In an exemplary embodiment of the disclosure, in learning mode 148, the firearm 100 can be used to perform a calibration sequence between the target sensor 151 and the weapon sight 134. Optionally, in the calibration sequence sensor 151 will sample the view while a unique preselected target is positioned at a specific distance and the firearm is held stable for a predefined time (for example 20 seconds). Sight 134 may be pointed toward the unique calibration target. For example, when using a CCD sensor, an A4 yellow paper with a big red rectangular shape in the center of the yellow paper. Optionally, each type of target sensor 151 is calibrated with a unique specific calibration target designed for the specific sensor. In an exemplary embodiment of the disclosure, the sight 134 should be calibrated relative to the firearm barrel 110 before performing sensor calibration.

In an exemplary embodiment of the disclosure, the firearm 100 is programmed or preprogrammed to identify and lock on lethal parts 163 of the target 162 (e.g. if the weapon is intended for combat). Alternatively, the firearm 100 is programmed or preprogrammed to identify and lock on less lethal parts 164 of the target (e.g. if the weapon is intended for police use or has a specific mode for less lethal scenarios).

In an exemplary embodiment of the disclosure, the firearm may be programmed or preprogrammed to identify and lock on a specific designation signal or sign that is produced by another device, for example a laser designator which is used to designate the target. Optionally, the firearm 100 target sensor 151 detects this specific marker and locks on it as a legal target and calculates with the target computer 150 the right firing solution to hit the designated target.

In an exemplary embodiment of the disclosure, each type of target sensor 151 is calibrated independently with weapon sight 134. It is assumed that the weapon sight 134 was calibrated with firearm 100 as known in the art. Optionally, the weapon sight 134 may be aimed toward a known target (e.g. a predefined specific colored or shaped marker at a specific range) that is identified by target sensor 151. Upon moving the mode selector 140 to learning mode 148 and engaging the trigger (without ammunition) while the firearm is held in a stable condition for a predefined time, for example 20 seconds and the weapon sight 134 is aimed at the known target. This will enable the firearm 100 to calibrate target sensor 151, since target sensor 151 identifies the known target as a calibration marker and the weapon sight 134 was previously calibrated with the firearm 100.

In some embodiments of the disclosure, firearm 100 includes multiple target identification modes 146 to handle different situations based on the user selection instead of using a status sensor 154 as described above. For example, each mode is configured to use a different type of target sensor 151. One mode is selected by the user to handle a situation in which visibility is poor and a second mode is selected to handle a situation in which visibility is clear. Optionally, by selecting an appropriate mode the firearm 100 can identify targets more accurately. Alternatively, the target computer 150 will automatically decide what the best target sensor 151 to use is based on the quality of the data provided by the target sensor 151. Optionally, target computer 150 may combine data from two or more sensors to improve target recognition accuracy and shorten target recognition latency.

In an exemplary embodiment of the disclosure, firearm 100 includes a trigger sensor 135 that identifies directly or indirectly if the trigger 120 is engaged (i.e. pressed by the user) or released. Optionally, the trigger sensor 135 may identify the position of the trigger 120 by a mechanical connection that moves with the trigger 120, by an electrical connection for example by closing or opening a circuit when the trigger 120 is engaged, by a Hall Effect sensor that monitors motion of the trigger 120 or by an optical element that identifies the position of the trigger 120 or if it blocks a light path. Optionally, the status of the trigger 120 can be determined by an indirect trigger sensor 135, which monitors other elements, for example monitoring the hammer, the sear or bolt carrier of the firearm 100.

In an exemplary embodiment of the disclosure, when the trigger 120 is engaged two possible automatic modes may be used:
1. The two-hit target identification mode (146) in which the engaged trigger 120 releases the hammer to strike the firing pin and release a first shot;
2. The first-hit target identification mode (149) in which the engaged trigger releases the hammer from the trigger to move toward the sear and waits for the fire control computer 170 and target computer 150 to calculate the best time to shoot by releasing the hammer to strike the firing pin.

In both cases the state of the trigger (engaged or not) can be known by the measurements of a hammer sensor, which may serve as an indirect trigger sensor 135 by identifying if the hammer is released or not. In any case when the trigger 120 is engaged the hammer is released and controlled by other elements. Optionally, the firearm 100 may use only a direct trigger sensor 135, an indirect trigger sensor 135 (e.g. a hammer sensor) or both to monitor the state of the trigger 120. In some embodiments of the disclosure, the firearm does not have a hammer, for example the Negev machine gun only uses a bolt carrier sear. Optionally, in the Negev machine gun trigger sensor 135 is represented by a direct trigger sensor 135 or an indirect trigger sensor 135 (e.g. a bolt carrier sensor) to identify the state of the trigger 120.

In an exemplary embodiment of the disclosure, the sear of the firearm is held or released responsive to the position of the trigger and commands from fire control computer 170. Optionally, an electromagnet or other means such as an electro-mechanical fire control (EMFC) 176 may be used to hold and release the sear of the firearm.

In an exemplary embodiment of the disclosure, firearm 100 also includes a power source 175, for example a battery to power elements of the firearm that require electrical power. Optionally, the power source 175 may be rechargeable.

In an exemplary embodiment of the disclosure, firearm 100 includes one or more firearm sensors 130 to determine the spatial orientation of the firearm 100 and identify motion and acceleration of the firearm 100. The sensors 130 may include a gyroscope, an accelerometer, a magnetometer and/or other sensors to measure the status of the firearm 100. Optionally, the firearm sensors 130 may be used to determine when to instruct the target computer 150 to start identifying and tracking targets in the view in front of the firearm 100. For example to optimize energy consumption when the firearm in not ready to shoot or to rapidly activate the target computer 150 when the user is getting into fire position, which can be identified by the movements of the firearm 100, stability, recoil status, EMFC status, trigger position or safety status. Optionally, the data from the firearm sensors 130 will be used to calculate the best ballistic solution to hit the target 162, by measuring the firearm spatial orientation, humidity, air temperature and other parameters.

In an exemplary embodiment of the disclosure, the firearm may be used to track a target, e.g. a hunter tracking a rabbit. Optionally, every time the firearm changes orientation (while the trigger is engaged) the target computer 150 will start looking for a new target in the field of view. Alternatively or additionally, the firearm may also accept real-time sensor data periodically for future analyses and shooting investigation. Optionally, the data may be collected in response to specific actions or when a predefined event happens, for example pressing the trigger, shooting or aiming. Alternatively, the data may be collected at specific time intervals, for example every second or 10 to 30 times a second.

In an exemplary embodiment of the disclosure, the data read by the target sensors 151, are provided to the target computer 150 to identify and track targets. Optionally, target computer 150 includes the following elements/modules:
1. a target sensor processor 152 to execute program modules;
2. a target database 153, which may include data for executing a neural network or AI algorithms.
3. a firing window module 155, which is a computer process that analyzes the data from the target sensors 151, the data from the firearm sensors 130, ammunition ballistic information and firearm status information to determine if a target will be hit or not;
4. a communications interface 156 that communicates with the fire control computer 170 and external devices such as a user's mobile telephone/tablet or computer;
5. a learning and calibration module 157 that enables the target computer to leant what is a legitimate target and what are non-legitimate targets and perform a calibration process with the weapon sight 134;
6. a memory 158 for use by the processor 152 to process data and execute program modules;
7. a record module 159 that accepts target sensor 151 data and stores it for future analyses by the user, for example shooting or training debriefing or improving computer algorithms of target computer 150.

In an exemplary embodiment of the disclosure, firing window module 155 determines if to instinct fire control computer 170 to release bullets based on analysis of the target sensor data, environmental conditions and the status of firearm 100 that is provided by fire control computer 170. In an exemplary embodiment of the disclosure the target computer 150 can be embedded in the firearm with the fire control computer 170 to form one processing computer collecting and analyzing target and firearm data together.

In an exemplary embodiment of the disclosure, fire control computer 170 includes a processor 172, a memory 174 and an electromechanical fire control (EMFC) 176 or other type of fire control (e.g. an electromagnetic system: a solenoid or motor and the like) that controls the release of bullets when the trigger 120 is engaged. The processor 172 is configured to analyze commands received from the target computer 150 and instruct the electromechanical fire control (EMFC) 176 to release a bullet when the trigger is engaged and the identified target are calculated by the target computer 150 using the firing window module 155 to be hit by the bullet.

In an exemplary embodiment of the disclosure, the firing window module 155 is designed to calculate and hit an area point on the target that will maximize lethality. Optionally, the firing window module 155 will predict the best moment to release a bullet from the firearm 100 to hit the area point.

In some embodiments of the disclosure, in a first method the legitimate targets identified in the target sensor 151 data by the target computer 150 before and/or after release of a first shot are identified automatically as targets and target control 150 tracks the identified targets in real-time. Target computer 150 may additionally instruct fire control computer 170 to release bullets toward an identified target 162 when the firing window module 155 algorithm decides that this target will be hit by bullets released by the firearm 100. Alternatively, in a second method target computer 150 may identify new targets in the real-time data received from the target sensors 151 and release bullets toward any legitimate target when the firing window module 155 calculates that the target will be hit. For example, according to the first method a hunter using mode 146 may aim at a specific rabbit and miss the first regular shot, but keep the trigger engaged and follow the rabbit with the rifle sight until the firearm 100 releases a bullet that hits the rabbit that was identified. Optionally, in this example the firing window module 155 calculates the best moment to release a bullet that will hit the target by considering the target size, relative speed, user stability, target approximate distance (target range), bullet firing delay (response time from command until the bullet is actually released from the firearm), bullet time to get to the target, ballistic solution and more. The firing window module 155 defines a virtual window between the firearm 100, the target 162 and release a bullet when the firearm 100 is aligned within the window. Optionally, firing window module 155 makes the window larger or smaller depending on the firearm status and environment status to enhance the probability of hitting the target 162. In an exemplary embodiment of the disclosure, other rabbits that appear later (especially if they are of a different color or different size) may be ignored if their properties show that they were not identified as legitimate targets. If the user releases the trigger and starts again new targets can be identified. Alternatively, according to the second method target computer 150 identifies legitimate targets in real-time data, so any rabbit is a legitimate target even if it was not locked initially when the trigger was initially engaged. In some embodiments of the disclosure, the user can select between the two methods, for example with mode selector 140.

Figure 2:
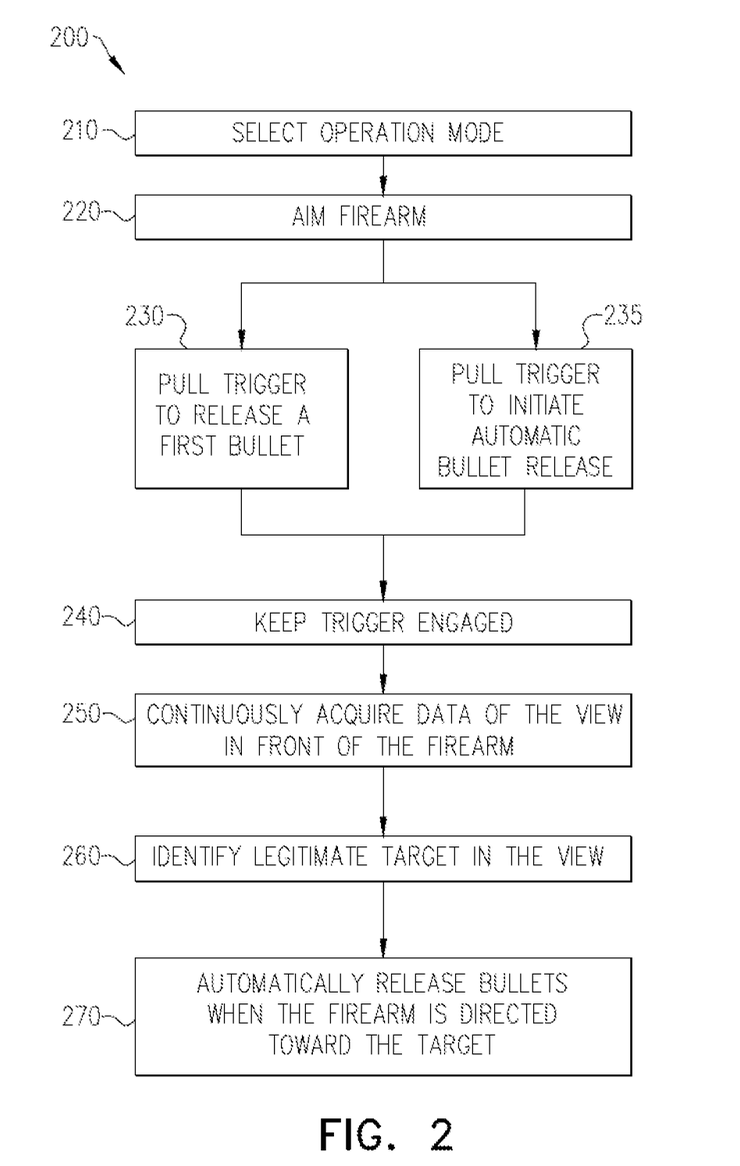
FIG. 2 is a flow diagram of a method of automatically releasing bullets toward a target, according to an exemplary embodiment of the disclosure.

FIG. 2 is a flow diagram of a method 200 of automatically releasing bullets toward a target 162, according to an exemplary embodiment of the disclosure. Initially the user selects (210) an operation mode by moving the mode selector 140 (e.g. to two hit target identification mode 146 or first hit target identification mode 149), so that the firearm 100 will be able to automatically release bullets toward a target 162 when the user aims the firearm 100 so that the target 162 will be hit. The user aims (220) the firearm toward the target 162, then pulls the trigger 120 to release (230) a first bullet toward the target 162 when two hit target identification mode 146 is selected. Alternatively, when first hit target identification mode 149 is selected when the user pulls the trigger firearm 100 does not release a bullet but only initiates (235) target computer 150 to automatically release bullets when identifying legitimate targets. In an exemplary embodiment of the disclosure, the user keeps the trigger 120 engaged (240) so the EMFC 176 can fire when receiving a fire signal from the fire control computer 170 after receiving a command to shoot from the firing window module 155. Accordingly, the firearm 100 can continuously release bullets automatically and accurately toward target 162. Optionally, the firearm 100 continuously acquires (250) real-time sensor data of the view in front of the firearm with target sensor 151 to form an image of the field of view of the sensor 151. In an exemplary embodiment of the disclosure, the target computer 150 of firearm 100 analyzes the real-time sensor data and identifies (260) legitimate targets 162, which the target computer 150 assumes that the user was aiming at. Then the user merely needs to continue engaging the trigger 120 and aim (e.g. by pointing or aiming) the firearm 100 toward the target 162 (e.g. the user moves the rifle towards the target without trying to stop for a shot). Optionally, the target computer 150 will automatically identify the target, calculate the best firing solution with the firing Window Module 155 and command the fire control computer 170 to fire at the correct moment, taking into account the target behavior and speed, the user movements, the right ballistic solution and other environmental conditions and firearm mechanical status (e.g. mode selector 140 position. EMFC 176 status, trigger 120 status and data from other firearm embedded sensors). In an exemplary embodiment of the disclosure, the firearm 100 will automatically release (270) bullets toward the target 162 when the barrel 110 of the firearm 100 is pointing toward the target 162 and the target computer 150 calculates that the bullets will hit the target 162.

In an exemplary embodiment of the disclosure, firearm 100 may be used to fire at a balloon or drone. Optionally, target computer 150 takes into account the shooting angle, which is directed upward and corrects the calculations to take into account shooting to the sky.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A firearm that automatically controls the release of bullets, comprising:
   one or more sensors that are configured to obtain real-time image data of the view in front of the firearm;
   a computer that is configured to identify legitimate targets in the real-time image data, without user intervention;
   a trigger sensor that is configured to directly or indirectly determine if the trigger is engaged;
   wherein while the trigger is engaged, the firearm is configured to continuously acquire real-time sensor data to serve as real-time image data, identify legitimate targets within the real-time image data and automatically release bullets toward the legitimate targets when the firearm predicts that at least one of the legitimate targets will be hit.

2. The firearm according to claim 1, wherein the firearm is configured to release a first bullet immediately when the trigger is engaged by the user.

3. The firearm according to claim 1, wherein the firearm configured to first identify targets before releasing a first bullet.

4. The firearm according to claim 1, wherein the one or more sensors include a camera, an infrared sensor, an acoustic sensor, an RF sensor, a Radar or a Lidar.

5. The firearm according to claim 1, wherein the firearm includes a status sensor that is configured to sample lighting or visibility of the view or image data and selects a sensor from the one or more sensors responsive to measurements of the status sensor.

6. The firearm according to claim 1, wherein the firearm is configured to use two or more different types of sensors for acquiring real-time image data to enhance accuracy.

7. The firearm according to claim 1, wherein the targets identified as legitimate, include targets that are designated by a device external to the firearm.

8. The firearm according to claim 1, wherein the firearm includes a mode selector configured to activate and deactivate the automatic release of bullets.

9. The firearm according to claim 1, wherein the firearm includes a mode selector configured to activate a learning mode in which a user teaches the firearm what are legitimate targets or what are non-legitimate targets.

10. The firearm according to claim 1, wherein the firearm includes a mode selector configured to activate a calibration mode in which a user calibrates the one or more sensors of the firearm.

11. The firearm according to claim 1, wherein the firearm is preconfigured or selectable to release bullets toward less-lethal areas on the target.

12. The firearm according to claim 1, wherein the firearm is preconfigured selectable to release bullets toward lethal areas on the target.

13. The firearm according to claim 1, wherein the computer includes a firing window module that is configured to calculate when to release a bullet for each shot so the target will be hit based on one or more of the following: a status of the firearm, environmental factors, a ballistic solution, a bullet firing delay, position and/or motion of the target relative to the barrel of the firearm and motion of the firearm relative to the target.

14. The firearm according to claim 13, wherein the firing window module sets a firing window size for allowing release of bullets when the target is aligned within the firing window.

15. The firearm according to claim 13, wherein the firing window size is adapted to the stability of the user and/or target motion, to increase probability of hitting the target.

16. The firearm according to claim 1, wherein the computer decides if to fire a bullet at lethal areas or less-lethal areas of the target based on the type of firearm and initial settings.

17. The firearm according to claim 1, wherein a firing window module is programed to calculate the best moment to release a bullet by predicting a hit point on the target according to a specific scenario of each shot.

18. The firearm according to claim 1, wherein the trigger sensor is represented by a hammer sensor that determines if the hammer is released and indirectly if the trigger is engaged.

19. The firearm according to claim 1, wherein legitimate targets are identified automatically in the real-time image data even if they did not appear in the real-time image data when the trigger was initially engaged.

20. The firearm according to claim 1, wherein legitimate targets are identified automatically in the real-time image data at any time.

21. A method of controlling the release of bullets from a firearm the firearm having a trigger, the method comprising:
- determining if the trigger is engaged using a trigger sensor that directly or indirectly determines if the trigger is engaged;
- as long as the trigger is engaged continuously acquiring with one or more sensors real-time image data of the view in front of the firearm;
- automatically identifying with a computer, legitimate targets in the real-time image data, without user intervention;
- automatically releasing bullets when the firearm predicts that at least one of the legitimate targets will be hit.

* * * * *